F. W. BATTERSHALL.
PROTRACTOR FOR GRAPHICAL INTEGRATION AND DIFFERENTIATION.
APPLICATION FILED MAR. 14, 1907.

907,716.  Patented Dec. 29, 1908.

WITNESSES
Marion H. Fisher
Paul Birdsall

INVENTOR
Fletcher W. Battershall

UNITED STATES PATENT OFFICE.

FLETCHER W. BATTERSHALL, OF ALBANY, NEW YORK.

PROTRACTOR FOR GRAPHICAL INTEGRATION AND DIFFERENTIATION.

No. 907,716.  Specification of Letters Patent.  Patented Dec. 29, 1908.

Application filed March 14, 1907. Serial No. 362,419.

*To all whom it may concern:*

Be it known that I, FLETCHER W. BATTERSHALL, a citizen of the United States, residing at Albany, county of Albany, and State of New York, have invented certain new and useful Improvements in Protractors for Graphical Integration and Differentiation, of which the following is a specification.

The improvement relates to means whereby the differentiation and integration of curves representing physical or mathematical functions may be simply and easily performed without mental calculation.

It is well known that the operations of the calculus may be performed graphically—that curves may be drawn which in respect to each other represent the differential and integral of a function. For example, if the ordinates and abscissa of a curve represent $f(x)$ and the gradient of that curve measured by tangents be plotted at a common scale as ordinates on the same or a new base line, and a curve be drawn through the extremity of these ordinates, the curve so obtained is the differential, or $f'(x)$, of the original curve. Conversely, the original curve is the integral of the derived curve.

The usual method of graphical differentiation is by actually drawing and measuring tangents at various points on $f(x)$. This method however is extremely inaccurate owing to the difficulty of drawing tangents to an irregular curve. By means of the device hereinafter described the tangent of the gradient is determined with much greater accuracy.

The device also allows the processes of the calculus to be applied to physical ratios obtained by experiment, and which cannot be treated mathematically owing to the impossibility of obtaining the algebraic formula expressing the ratio. With the device here described any varying function that can be represented graphically can be differentiated or integrated whether the formula be known or not.

I am aware that machines are made to perform the operations of the calculus graphically, but they are complicated and expensive, while that herein described is of great simplicity, and fairly accurate.

Figure 1:
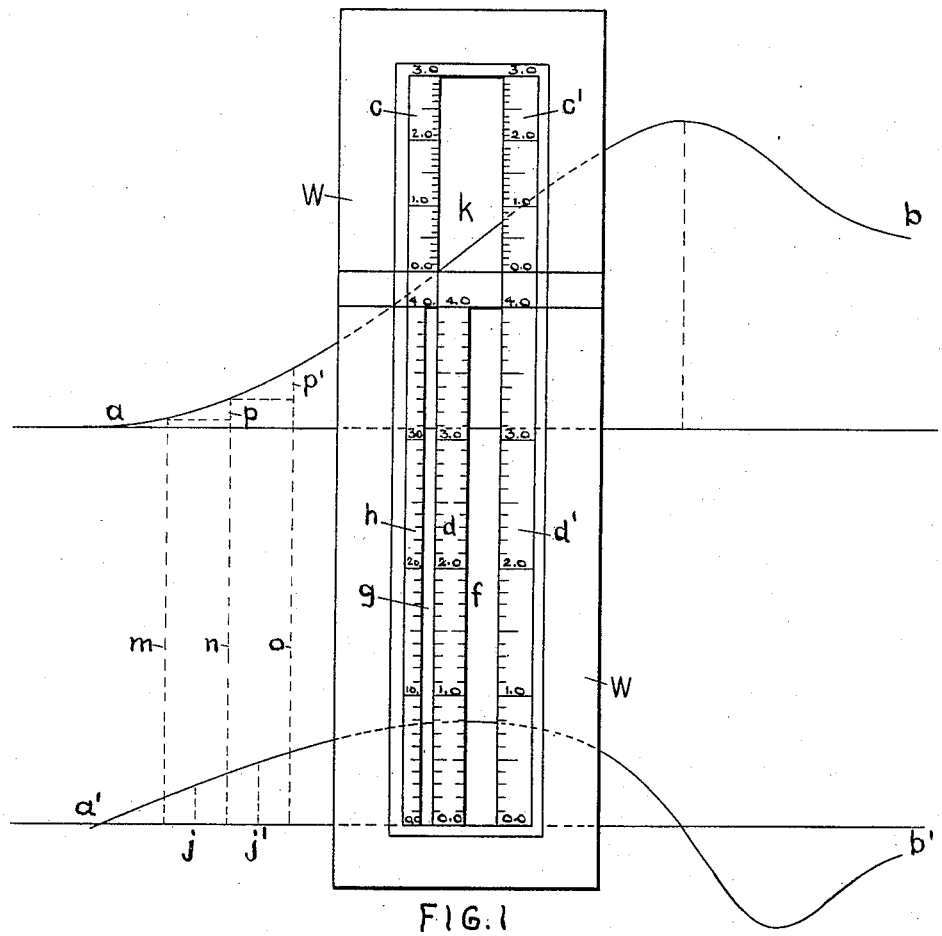
Figure 2:
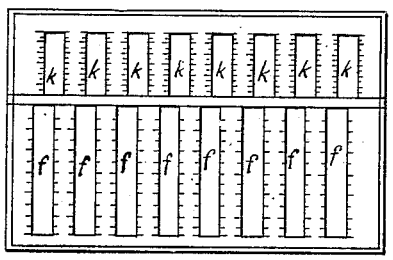
Figure 3:
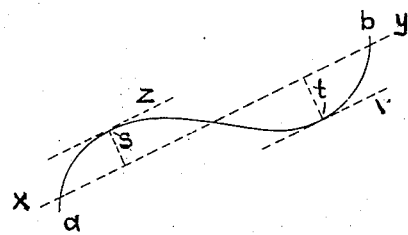

In the accompanying drawing, Figure 1 shows the device applied to a differential and integral curve. Fig. 2 shows a form of the device adapted to obviate the necessity of shifting it horizontally. Fig. 3 is a diagram illustrating the principle employed when the device is used to differentiate.

Referring to Fig. 1—the device consists of a templet or protractor (W—W) which may be made of any thin material, preferably transparent. An opening ($k$) in the protractor has vertical scales ($c$—$c'$) on the edges thereof which are so proportioned with reference to the width of the opening that when applied to a curve ($a$—$b$), as shown in the drawing, the numerical value of the tangent of the angle which the secant of the curve makes with the horizontal is read on the scale $c$ or $c'$, as the case may be. For example: the protractor as applied to the curve $a$—$b$ gives the reading of the tangent as 0.8, which is evidently the tangent of the average gradient of the portions of the curve disclosed by the space $k$. It is also evident, by the principles of the calculus, that if the value 0.8 be plotted as a vertical ordinate at the middle point of the curve disclosed by the space $k$ it will be an ordinate of the differential curve, with an accuracy which depends upon the nearness to which the disclosed curve approaches a straight line. When the curve is straignt or nearly straight the derived ordinate is plotted on the scale ($d$) which is under the middle point of the opening ($k$), the protractor being shifted vertically to the base line chosen. The scales $d$ and $d'$ are graduated to a unit which is the reciprocal of the unit used on the scales $c$—$c'$, $d'$ being vertically under $c'$. The drawing shows the ordinate of the derived curve plotted at 0.8 on the scale $d$. The protractor is shifted horizontally to obtain successive points on the derived curve $a'$—$b'$. When however the curve disclosed by the space $k$ has a large degree of curvature considerable error will result in plotting the derived ordinate under the middle portion of $k$. In this case a different method of plotting is used, founded upon Rolle's theorum, as follows—Referring to Fig. 3—if on any continuous curve whatever ($a$—$b$) a secant ($x$—$y$) be drawn, there are one or more points on the curve the tangents to which are parallel to the secant. Moreover, these points are the points of the greatest departure of the curve from the secant. Thus, at the points $s$ and $t$ furthest from the secant the tangents $z$ and $v$ are parallel to the secant. It follows that if the tangent of the angle of inclination of the secant be plotted underneath these points of greatest departure $s$ and $t$ they will be ordinates of the derived curve. The device provides for this as follows—The inclination of the secant which may be drawn, or assumed to be drawn, is measured on the scale $c$ or $c'$ and the protractor then shifted horizontally until the scale $c'$ is brought over the point where the curve makes the greatest departure from the secant and the ordinate plotted on the scale $d'$. It is evident that if the point of greatest departure is accurately located the construction is exact for the point thus found. If great accuracy is desired these points may be located and the secant drawn before using the protractor, but fair accuracy may be obtained by locating the points by eye after the protractor is placed.

Referring again to Fig. 1—$g$ is a space much narrower than $k$ and adapted to measure gradients of the curve making a large angle with the horizontal. These are measured on the scale $h$ and plotted on the center line of the space $g$ according to readings taken on the left hand portion of the scale $d$ or the scale $h$, these two scales having a decimal relation to each other, so that the numbering on scale $h$ can easily be transferred by sight to the scale $d$, which construction is adopted solely to avoid confusion by a multiplicity of figures on the scales. For example: if the width of the space $g$ be 1/10th. of an inch, a rise of 8 vertical to 1 horizontal, though reading 0.8 on the left hand portion of scale $d$, will be easily read as 8.0 on the adjacent scale $h$ which alone is used to read scalar units when using space $g$ to measure gradients. Nevertheless, the scalar units of $d$ will be used in plotting the result as an ordinate of the differential curve. Thus, in the example chosen above, an 8 inch ordinate would be plotted in the center line of the space $g$ by shifting the protractor vertically until the necessary number of inches have been stepped off. This portion of the protractor can be used where the curve to be differentiated has great curvature.

The process of integration with the protractor is the reverse of the process of differentiation above described. Thus, if the height of the curve to be integrated, ($a'$—$b'$), be 0.8 measured on the scale $d$, then there is an increase of 0.8 in the ordinate of the integral curve to be measured on the scale $c'$. As is well known, the difference between the length of any two ordinates of the integral curve in units of length equals the area of the differential curve between corresponding ordinates in square units this being a fundamental relation between such curves as is demonstrated mathematically in treatises on calculus. And, referring to Fig. 1, and considering the two edges of scale $d$, and scale $d'$ as three consecutive ordinates, scale $d$ is so proportioned as to measure the number of square units comprehended between the curve and the two outer ordinates, while scales $c$ and $c'$ are so proportioned with reference to scale $d$ as to permit the number of square units found on $d$ to be plotted in linear units of rise of the integral curve. Thus, if the ratio of scales be so proportioned that the distance from the left hand side of scale $d$ to scale $d'$ be 0.5 inches, then the area of that portion of the curve to be integrated and plotted as a rise (as shown on Fig. 1) though read directly on the right hand side of scale $d$ as 0.8 square inches (and being actually 0.4 square inches) is plotted on scale $c'$ as 0.8 of half an inch, the vertical unit of $c'$ being one half an inch by reason of the fact that the horizontal unit is also half an inch. It is apparent that it is wholly a matter of ratios in constructing the vertical and horizontal scales, and that any scalar units whatever may be adopted so long as the unit of the scales $d$—$d'$ is the reciprocal of the unit used on the scales $c$—$c'$. Negative areas (or areas below the base line) are measured by bringing the zero of the right hand portion of the scale $d$ to the curve and reading the graduation of that scale cut by the base line. Such negative area being represented by a drop on the integral curve, is plotted by using the scale $c$ and plotting the drop at the zero of scale $c'$. A similar method is employed when using the scales adjacent to the space $g$.

It is evident that scales of various proportions may be combined in one protractor to meet varying conditions, and several scales of the same character may be arranged side by side to minimize the shifting of the protractor. Such a construction is shown in Fig. 2 where $k$—$k$ are a series of rectangular openings in the protractor having scales on their vertical edges, the unit being equal to the width of said spaces, and $f$—$f$ are another series of rectangular openings of the same width as the one above, and having scales on their vertical edges the unit thereof being the reciprocals of the units used on the vertical edges of the scale above, one edge of each lower opening being located vertically beneath the middle line of an upper opening.

Having now described my invention, what I claim is—

1. A protractor having a rectangular opening with scales on the vertical edges thereof, the unit being equal to the width of said opening, and having vertically beneath said opening another rectangular opening half the width of the former and having scales on the vertical edges thereof, one of which is in line with an edge of the upper opening, the unit of the scales on the lower opening being the reciprocal of the unit of the scales on the upper opening.

2. A protractor having a rectangular opening therein with another rectangular opening below the same so placed that one edge of the lower opening is in line with the middle line of the upper opening and the other edge of the lower opening is in line with an edge of the upper opening, the vertical edges of both openings having scales marked thereon.

3. A protractor having a rectangular opening $k$ with scales $c$—$c'$ on the vertical edges thereof, and underneath said opening another rectangular opening $f$ with scales $d$—$d'$ on the vertical edges thereof, substantially as described.

4. A protractor having a narrow vertical rectangular opening therein with scales on the vertical edges thereof, said scales having a decimal relation to the width of said opening, substantially as described.

FLETCHER W. BATTERSHALL.

Witnesses:
MARION H. FISHER,
ANNA T. WANSBORO.